US012072675B2

(12) United States Patent
Blatter et al.

(10) Patent No.: US 12,072,675 B2
(45) Date of Patent: Aug. 27, 2024

(54) ROTARY DISK MOON PHASE INDICATOR

(71) Applicant: The Swatch Group Research and Development Ltd, Marin (CH)

(72) Inventors: Cédric Blatter, Commugny (CH); Simon Springer, Berne (CH)

(73) Assignee: The Swatch Group Research and Development Ltd, Marin (CH)

( * ) Notice: Subject to any disclaimer, the term of this patent is extended or adjusted under 35 U.S.C. 154(b) by 512 days.

(21) Appl. No.: 17/379,178

(22) Filed: Jul. 19, 2021

(65) Prior Publication Data

US 2022/0113679 A1 Apr. 14, 2022

(30) Foreign Application Priority Data

Oct. 13, 2020 (EP) .................................... 20201541

(51) Int. Cl.
*G04B 19/26* (2006.01)

(52) U.S. Cl.
CPC ................................. *G04B 19/268* (2013.01)

(58) Field of Classification Search
CPC .............................. G04B 19/26; G04B 19/268
See application file for complete search history.

(56) References Cited

U.S. PATENT DOCUMENTS

| | | | | |
|---|---|---|---|---|
| 2006/0007787 | A1 | 1/2006 | Born et al. | |
| 2014/0247699 | A1* | 9/2014 | Sembritzki .......... | G04B 19/268 368/15 |
| 2014/0247898 | A1 | 9/2014 | Sembritzki et al. | |
| 2018/0267474 | A1* | 9/2018 | Lagorgette ........... | G04B 19/268 |

FOREIGN PATENT DOCUMENTS

| | | | | |
|---|---|---|---|---|
| CN | 1109605 A | 10/1995 | | |
| CN | 1519669 A | 8/2004 | | |
| CN | 1719351 A | 1/2006 | | |
| CN | 107577135 A | 1/2018 | | |
| CN | 111 258 205 A | 6/2020 | | |
| CN | 111258205 A | 6/2020 | | |
| EP | 1 615 086 A1 | 1/2006 | | |
| EP | 1 701 227 A1 | 9/2006 | | |
| FR | 2790564 A1 * | 9/2000 | ........... | G04B 19/268 |

(Continued)

OTHER PUBLICATIONS

Translation of FR2790564, Espacenet, 2023.*

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A display device for a timepiece representing the lunar libration phenomenon thanks to at least one Moon disk, to at least one aperture and to at least one drive organ. The at least one Moon disk includes a set of Moon phase representations including at least three Moon phases with a first surface, a second surface and/or a delimitation configured to delimit this first surface and this second surface. The at least one aperture being configured to reveal this set of Moon phase representations and this at least one drive organ is configured to move this at least one Moon disk so as to represent the lunar libration phenomenon.

15 Claims, 4 Drawing Sheets

(56) References Cited

FOREIGN PATENT DOCUMENTS

| | | | | |
|---|---|---|---|---|
| GB | 2 454 905 | A | | 5/2009 |
| GB | 2 454 949 | A | | 5/2009 |
| JP | 10 62561 | A | | 3/1998 |
| JP | 2006-23299 | A | | 1/2006 |
| JP | 2018-155747 | A | | 10/2018 |
| KR | 200302597 | Y1 | * | 2/2003 |

OTHER PUBLICATIONS

Translation of KR200302597, Espacenet, 2023.*
Translation of EP1701227, Espacenet, 2023.*
Office Action issued Sep. 13, 2022, in corresponding Japanese Patent Application No. 2021-123902 (English Translation only), 6 pages.
European Search Report issued Mar. 2, 2021 in European Application 20201541.8, filed on Oct. 13, 2020 (with English Translation of Categories of cited documents), 3 pages.
Combined Chinese Office Action and Search Report issued in Chinese Patent Application No. 202111049823 X on Feb. 29, 2024 (with English translation), citing documents 1-2 and 15-20 therein.

* cited by examiner

ROTARY DISK MOON PHASE INDICATOR

CROSS-REFERENCE TO RELATED APPLICATION

This application claims priority to European Patent Application No. 20201541.8 filed on Oct. 13, 2020, the entire disclosure of which is hereby incorporated herein by reference.

TECHNICAL FIELD

The present application relates to the field of watchmaking and more particularly Moon phase representation. Preferably, the present invention relates to a faithful representation of Moon phases according to certain parameters and/or at the user's request.

TECHNOLOGICAL BACKGROUND

Most Moon phase indicators use an element whereon two whole Moons rotating under a mask and appearing in an aperture are represented. The angular position of the Moons rotating with respect to the mask and the aperture attempts to simulate the appearance of the Moon phase seen in the sky. This mechanism merely gives a crude representation, especially for the waxing and waning phases respectively after and before the half-Moon.

Furthermore, over time, the curvature of the light side of the Moon remains constant on these Moon phase indicators, in this instance, convex after the first quarter for example, instead of becoming concave as can be observed in reality.

Several models propose another concept which consists of representing different Moon phases on a dial and of using a retrograde hand to indicate the Moon phase. However, it would seem that the Moon phase representations are static and very crude as there are merely 3 or 4 representations to illustrate the approximately 28 Moon phases.

Moreover, it would seem that the libration phenomenon is completely absent in these representations, which a large majority of enthusiasts find regrettable.

SUMMARY OF THE INVENTION

The aim of the present invention that of solving all or some of these drawbacks by means of a display device for a timepiece and preferably of a timepiece, particularly for displaying a set of Moon phase representations reproducing the image of the Moon in the sky, preferably during the lunar libration phenomenon; said display device being configured to function according to at least a first primary operating mode and/or according to at least a first secondary operating mode and comprising at least one:

- Moon disk; said at least one Moon disk comprising said set of Moon phase representations; said set of Moon phase representations including at least three Moon phases and each Moon phase of said at least three Moon phases being configured to have a first surface, a second surface and/or a delimitation configured to delimit said first surface and said second surface;
- Aperture; said at least one aperture being configured to reveal said set of Moon phase representations, preferably one Moon phase of said at least three Moon phases; and,
- Drive organ; said at least one drive organ being configured to move said at least one Moon disk along a first axis in said at least a first primary operating mode and/or to move said at least one aperture along a second axis in at least a first secondary operating mode.

Thanks to this arrangement, the present invention makes it possible to represent different Moon phases reproducing as faithfully as possible the image of the Moon in the sky, in the Northern hemisphere or in the Southern hemisphere, as well as the course of the regions of the Moon visible from Earth, i.e. the illuminated structures, i.e. the lunar libration phenomenon.

According to an embodiment, said at least one Moon disk is configured to be movable along said first axis between at least a first primary position and at least a second primary position in said at least a first primary operating mode and/or said at least one aperture is configured to be movable along said second axis between at least a first secondary position and at least a second secondary position in said at least a first secondary operating mode.

Thanks to this arrangement, said set of Moon phase representations represents the Moon in different hemisphere according to the operating mode.

According to an embodiment, said display device comprises a switching organ configured to switch between said first primary operating mode and said first secondary operating mode.

Thanks to this arrangement, the user can switch between said first primary operating mode and said first secondary operating mode.

According to an embodiment, said at least one Moon disk is configured to be movable in at least a first primary direction in said at least a first primary operating mode and/or said at least one aperture is configured to be movable in at least a first secondary direction in said at least a first secondary operating mode.

According to an embodiment, said at least one Moon disk is configured to be movable in at least a second primary direction in said at least a first primary operating mode and/or said at least one aperture is configured to be movable in at least a second secondary direction in said at least a first secondary operating mode.

According to an embodiment, said at least a first primary direction is opposite said at least a first secondary direction and/or said at least a second primary direction is opposite said at least a second secondary direction.

Thanks to this arrangement, the different Moon phases reproduce the image of the Moon in the sky as well as the movement of the illuminated structures and the visible surface in the Northern hemisphere and/or in the Southern hemisphere.

According to an embodiment, said at least one drive organ is configured to move said at least one Moon disk between said at least a first primary position and said at least a second primary position in said at least a first primary operating mode and/or said at least one aperture between said at least a first secondary position and said at least a second secondary position in said at least a first secondary operating mode.

According to an embodiment, said at least one drive organ is configured to move along a first primary direction said at least one Moon disk from said at least a first primary position to said at least a second primary position in said at least a first primary operating mode and/or to move along a second primary direction said at least one Moon disk from said at least a second primary position to said at least a first primary position in said at least a first primary operating mode.

According to an embodiment, said at least one drive organ is configured to move along a first secondary direction said at least one aperture from said at least a first secondary position to said at least a second secondary position in said at least a first secondary operating mode and/or to move along a second secondary direction said at least one aperture from at least a second secondary position to said at least a first secondary position in said at least a first secondary operating mode.

Thanks to one or the other of these preceding arrangements, said at least one aperture and/or said at least one Moon disk reproduces or reproduce the exact image of the Moon in the sky as well as the movement of the illuminated structures and the visible surface, in the Northern hemisphere and/or in the Southern hemisphere according to the latitude where the viewer is located and for a given time.

According to an embodiment, said display device comprises at least one control unit configured to control the movement of said at least one Moon disk between said at least a first primary position and said at least a second primary position via said at least one drive organ in said at least a first primary operating mode and/or said at least one aperture between said at least a first secondary position and said at least a second secondary position via said at least one drive organ in said at least a first secondary operating mode.

Thanks to this arrangement, said at least one control unit controls the positioning of said at least one aperture and/or said at least one Moon disk so as to reproduce the image of the Moon in the sky as well as the movement of the illuminated structures and the visible surface in the Northern hemisphere and/or in the Southern hemisphere.

According to an embodiment, said at least one control unit is configured to receive a data set; said data set includes at least:

a date;

a time; and/or a geographic position.

Thanks to this arrangement, said display device makes it possible to represent different Moon phases reproducing as faithfully as possible the image of the Moon in the sky as well as the movement of the illuminated structures and the visible surface, according to said data set.

According to an embodiment, said at least a first primary position, said at least a second primary position, said at least a first secondary position and/or said at least a second secondary position is determined or are determined by the user and/or by said at least one control unit, preferably by said data set.

According to an embodiment, said data set is received by said at least one control unit via radiofrequency communication, via satellite geolocation, and/or via wired and/or light communication or said data set is introduced manually.

Thanks to one or the other of these preceding arrangements, said display device makes it possible to represent different Moon phases reproducing as faithfully as possible the image of the Moon in the sky as well as the movement of the illuminated structures and the visible surface, at the user's request and/or automatically by said at least one control unit.

According to an embodiment, said first axis and said second axis are coaxial.

According to an embodiment, said at least one Moon phase is configured to be rotated about said first axis and/or said aperture is configured to be rotated about said second axis.

Thanks to one or the other of these preceding arrangements, the mechanism of said display device is simplified to represent the different Moon phases.

According to an embodiment, said first surface is an opening in said at least one Moon disk, that is transparent or translucent, said second surface is opaque or translucent, said first surface is more transparent or more translucent than said second surface, and/or said first surface is lighter than said second surface.

According to an embodiment, said display device comprises a Moon representation configured to appear in said opening, through said first surface and/or through said second surface.

Thanks to one or the other of these preceding arrangements, the present invention makes it possible to represent different Moon phases reproducing as faithfully as possible the image of the Moon in the sky, in the Northern hemisphere or in the Southern hemisphere, as well as the course of the illuminated structures and the visible surface.

According to an embodiment, said display device comprises at least one light source, said at least one light source being configured to illuminate, preferably through, said first surface and/or said second surface, and/or a reflective surface, such as a mirror, such as a white diffuse surface and/or a brilliant stone.

Thanks to this arrangement, said display device represents the different Moon phases by reproducing as faithfully as possible the image of the Moon in the dark.

According to an embodiment, said first surface comprises a material that is brilliant, reflective, luminescent photoluminescent, and/or made of barium sulphate, and/or said second surface comprises a material that is opaque, photoabsorbent, and/or made of carbon and/or made of carbon nanotubes.

Thanks to this arrangement, said display device represents the different Moon phases by reproducing as faithfully as possible the image of the Moon.

According to an embodiment, said delimitation comprises a radius of curvature, preferably said delimitation of each Moon phase of said at least three phases comprises a separate radius of curvature optimally representing the actual shape of the terminator.

Thanks to this arrangement, said display device represents the different Moon phases by reproducing as faithfully as possible the image of the different Moon phases.

According to an embodiment, said set of Moon phase representations is configured to represent the Moon libration phenomenon.

According to an embodiment, said set of Moon phase representations including at least twenty-eight Moon phases.

Thanks to one or the other of these preceding arrangements, said display device reproduces the movement of the illuminated structures and the visualisation of the different parts of the lunar surface at different times.

According to an embodiment, said display device comprises at least a second primary operating mode, wherein said at least one Moon disk is immobile and/or at least a second secondary operating mode, wherein said at least one aperture is immobile.

According to an embodiment, said first surface, said second surface and/or said at least one light source comprises or comprise at least one relief such as a lunar crater.

Thanks to this arrangement, the present invention makes it possible to represent different Moon phases reproducing as faithfully as possible the image of the Moon in the sky.

The present invention relates to a watch comprising a display device according to at least one embodiment of the present invention.

Thanks to this arrangement, the present invention makes it possible to represent different Moon phases reproducing as faithfully as possible the image of the Moon in the sky, in the Northern hemisphere or in the Southern hemisphere, as well as the course of the illuminated structures, i.e. the lunar libration phenomenon.

BRIEF DESCRIPTION OF THE FIGURES

The invention will be described hereinafter in more detail using the appended drawings, given as non-restrictive examples, wherein.

DETAILED DESCRIPTION OF THE INVENTION

Figure 1:
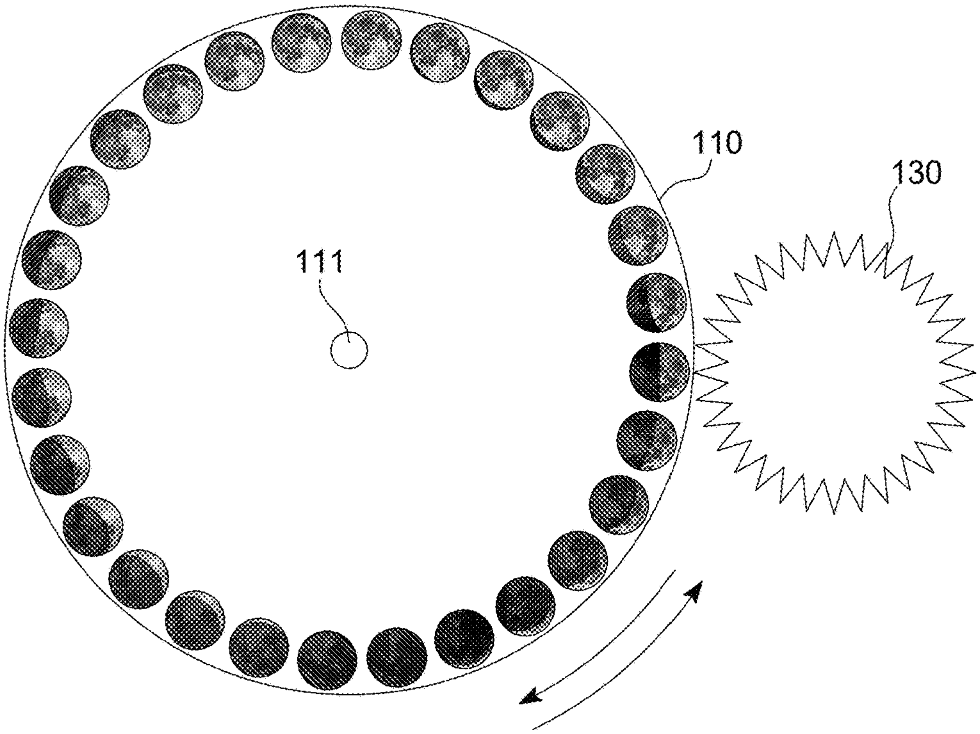
FIG. 1 illustrates at least one Moon disk 110 according to one embodiment of the invention.

Watches are available including Moon phase indicators with an element whereon two whole Moons rotating under a mask and appearing in an aperture are represented crudely without being faithful in the waxing and waning phases, or for the regions visible from Earth, regardless of the viewer's position in the world.

The present invention makes it possible to represent different Moon phases reproducing as faithfully as possible the image of the Moon in the sky, in the Northern hemisphere or in the Southern hemisphere, as well as the course of the illuminated structures and the visible surface.

Indeed, the present invention can relate to a watch comprising a display device 100 for a timepiece and preferably of a timepiece. Said display device 100 is configured to display a set of Moon phase representations 115 reproducing the image of the Moon in the sky, and is configured to function according to at least one operating mode from at least a first primary operating mode 150, at least a second primary operating mode 159, at least a first secondary operating mode 160 and/or at least a second secondary operating mode 169.

Switching between at least a first primary operating mode 150, at least a second primary operating mode 159, at least a first secondary operating mode 160 and/or at least a second secondary operating mode 169 is permitted thanks to a switching organ configured to switch between at least a first primary operating mode 150, at least a second primary operating mode 159, at least a first secondary operating mode 160 and/or at least a second secondary operating mode 169, such that the user can switch between at least a first primary operating mode 150, at least a second primary operating mode 159, at least a first secondary operating mode 160 and/or at least a second secondary operating mode 169.

Said display device 100 can comprise at least one Moon disk 110, at least one aperture 120 and at least one drive organ 130 configured to move said at least one Moon disk 110 and/or to move said at least one aperture 120.

Said at least one Moon phase 110, seen in FIG. 1, can comprise said set of Moon phase representations 115 mentioned above. Said set of Moon phase representations 115 includes at least three Moon phases and each Moon phase 116 of said at least three Moon phases is configured to have a first surface 118, a second surface 119 and/or a delimitation 117 configured to delimit said first surface 118 and said second surface 119. Said first surface 118 and/or said second surface 119 comprises or comprise at least one relief effect such as a lunar crater, either printed in 3D or microstructured or printed in 2D with shades of colours so as to best represent the Moon.

Said delimitation 117 can be absent or be merged with the curvature of the Moon representation during the full Moon and/or during the new Moon. Thus, said delimitation 117 comprises a radius of curvature, preferably said delimitation 117 of each Moon phase 116 of said at least three phases comprises a separate radius of curvature such that each Moon phase 116 of said at least three phases reproduces as faithfully as possible the image of the corresponding phase.

According to the embodiments, said first surface 118 can be more transparent or more translucent than said second surface 119, and/or said first surface 118 can be lighter than said second surface 119. Moreover, according to the alternative embodiments, said first surface 118 can be an opening in said at least one Moon disk 110, be transparent or be translucent and/or said second surface 119 can be opaque or be translucent. In these embodiments, said display device 100 can comprise a Moon representation configured to appear in said opening, through said first surface 118 and/or through said second surface 119. Said Moon representation can be static and can be located on a part of said watch, preferably, on a portion of the dial of said watch.

Moreover, said display device 100 can comprise at least one light source 140 configured to illuminate, preferably through, said first surface 118 and/or said second surface 119 and whereon, i.e. on said at least one light source 140, said Moon representation can be located. Thus, advantageously, said first surface 118, whether it is open, transparent, or translucent makes it possible to allow light through more easily than said second surface 119, which is rather opaque or less translucent, such that the different Moon phases reproduce as faithfully as possible the image of the Moon in the dark. It is also possible to replace said at least one light source 140 by a reflective surface, such as for example a mirror, a white diffuse surface and/or a brilliant stone in order to obtain the same result.

It should be noted that although said first surface 118 can be open, transparent or translucent, these alternative embodiments cannot be considered as being equivalent since an opening can have advantages that a transparent or translucent surface cannot offer. Indeed, it is possible, thanks to a laser, to make an opening in said second surface 119 so as to create said first surface 118 as well as said delimitation 117, and to prevent alignment problems with said at least one light source 140, which can be disposed on the entire rim of said at least one Moon disk 110 such as for example in the second and third embodiments, on one hand and on the other, whereas said second surface 119 can increasingly restrict the passage of the light rays from said at least one light source 140, over time, said first surface 118, i.e. said opening, will remain unchanged and therefore will represent, over time, the different Moon phases by reproducing as faithfully as possible the image of the Moon in the sky. This is the case for example, when the image of the Moon is imprinted on said at least one light source 140 and said second surface 119 conceals completely or partially the image of the Moon imprinted on said at least one light source 140, and said opening, though constant therefore will remain unchanged, will reveal the luminous part of the Moon representation, i.e. said first surface 118 which will change over time.

According to further alternative embodiments, said first surface 118 can be closed, or solid as opposed to open, and can comprise a material that is brilliant, reflective, luminescent, photoluminescent, and/or made of barium sulphate. It should be borne in mind that it is not ruled out that said second surface 119 can be made of an opaque or translucent material while being fully or partially coated with a material that is opaque, photo-absorbent, and/or made of carbon and/or made of carbon nanotubes.

The attentive observer will note that said set of Moon phase representations 115, illustrated in the present application, can comprise at least four Moon phases and up to twenty-nine, or even thirty, Moon phases and can thus represent the Moon phases as finely as possible. For this purpose, said first surface 118 and said second surface 119, preferably in conjunction with said delimitation 117, show for each Moon phase different parts of the surface of the Moon observable in the sky, at each phase.

Moreover, said at least one Moon disk 110 is configured to be movable along a first axis 111 between at least a first primary position 151 and at least a second primary position 152 in said at least a first primary operating mode 150 such that said set of Moon phase representations 115 can represent the Moon in different hemispheres according to the operating mode.

Said at least one aperture 120, for its part, is configured to reveal said set of Moon phase representations 115, preferably one Moon phase 116 of said at least three Moon phases, and is configured to be movable along a second axis 121 between at least a first secondary position 161 and at least a second secondary position 162 in said at least a first secondary operating mode 160. It should be noted that said first axis 111 and said second axis 121 can be coaxial or separate.

Figure 2:
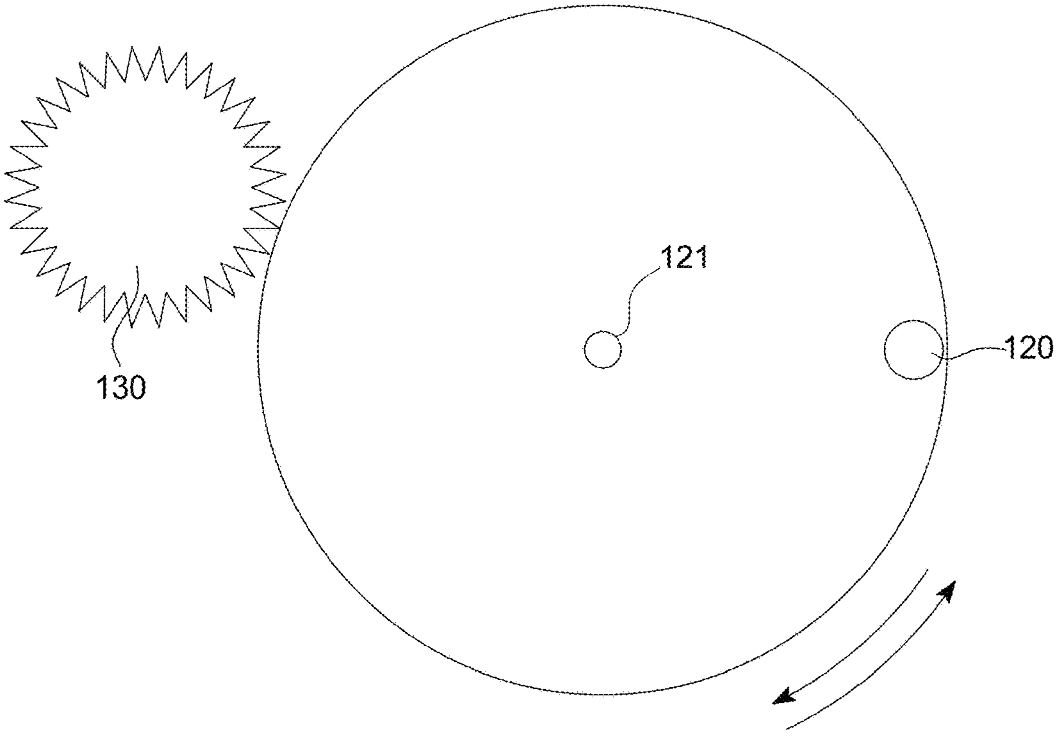
FIG. 2 shows at least one aperture 120 according to one embodiment of the invention.

As mentioned above, said at least one drive organ 130, represented in FIGS. 1 and 2, can move along a first primary direction 155 said at least one Moon disk 110 from said at least a first primary position 151 to said at least a second primary position 152 in said at least a first primary operating mode 150 and/or can move along a second primary direction 156, which can be opposite said a first primary direction 155, said at least one Moon disk 110 from said at least a second primary position 152 to said at least a first primary position 151 in said at least a first primary operating mode 150.

Quite similarly, said at least one drive organ 130 can also move along a first secondary direction 165 said at least one aperture 120 from said at least a first secondary position 161 to said at least a second secondary position 162 in said at least a first secondary operating mode 160 and/or can move along a second secondary direction 166, which can be opposite said a first secondary direction 165, said at least one aperture 120 from said at least a second secondary position 162 to said at least a first secondary position 161 in said at least a first secondary operating mode 160. In the embodiments where said first axis 111 and said second axis 121 are separate, said at least one drive organ 130 can be placed between said at least one aperture 120 and said at least one Moon disk 110 and a mesh system capable of being disconnected, well-known to a person skilled in the art, makes it possible to move said at least one Moon disk 110 along said first axis 111, preferably rotating about said first axis 111, and/or move said aperture 120 along said first axis 121, preferably rotating about said second axis 121. An alternative to this embodiment can provide two drive organs 130, such that said at least one Moon disk 110 and said at least one aperture 120 are moved independently.

Figure 4A:
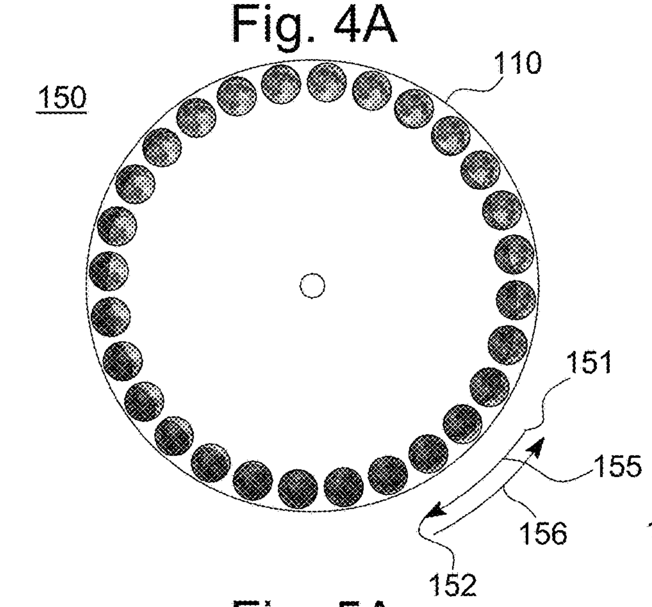
FIGS. 4A, 4B and 7 show the use of said at least one Moon disk 110 and of said at least one aperture 120 according to a first embodiment.
Figure 4B:
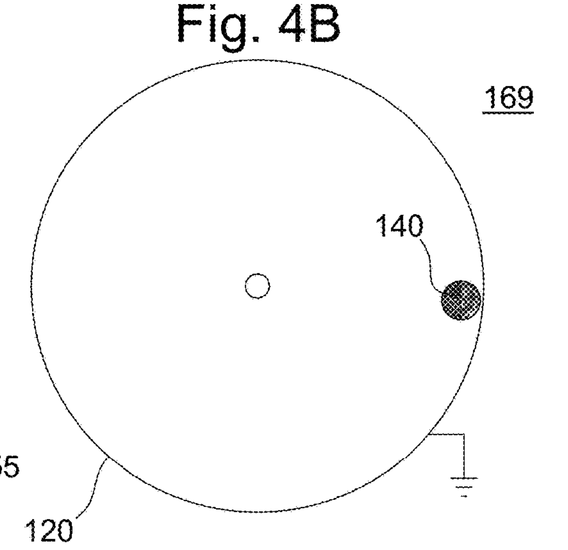

As mentioned above, said display device 100 can be configured to function according to said at least a second primary operating mode 159 and/or according to said at least a second secondary operating mode 169. As can be seen in FIGS. 4A and 4B, said at least one Moon disk 110 is immobile in said at least a second primary operating mode 159, whereas it is said at least one aperture 120 which is immobile in said at least a second secondary operating mode 169, FIGS. 5A and 5B.

Figure 6A:
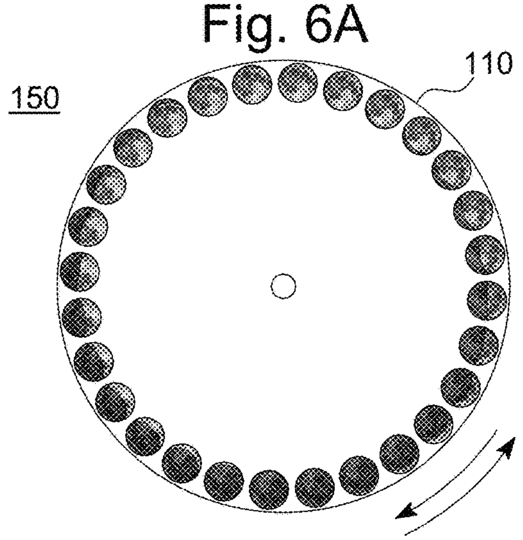
Figure 6B:
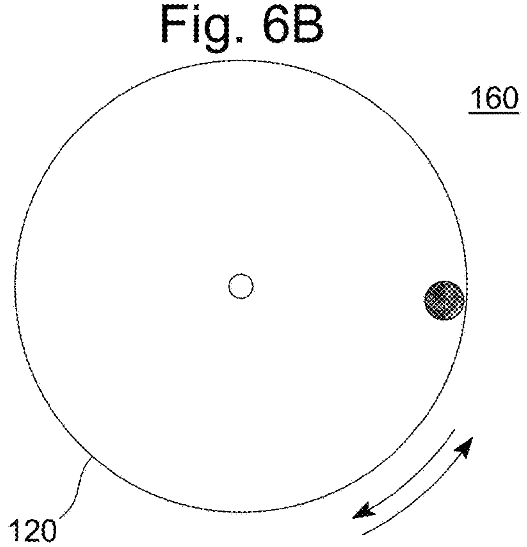

As illustrated in FIGS. 6A and 6B, the directions of mobility 155, 156, 165, 165 of said at least one Moon disk 110 and of said at least one aperture 120 in said at least a first primary operating mode 150 and/or in said at least a first secondary operating mode 160 can be observed in the third embodiment, since said at least one Moon disk 110 and said at least one aperture 120 can be movable simultaneously and independently, such that the different Moon phases reproduce the image of the Moon in the sky in the Northern hemisphere and/or in the Southern hemisphere.

This mobility of said at least one Moon disk 110 and/or of said at least one aperture 120 can be controlled by at least one control unit making it possible to move said at least one Moon disk 110 between said at least a first primary position 151 and said at least a second primary position 152 via said at least one drive organ 130 in said at least a first primary operating mode 150 and/or said at least one aperture 120 between said at least a first secondary position 161 and said at least a second secondary position 162 via said at least one drive organ 130 in said at least a first secondary operating mode 160.

Figure 3:
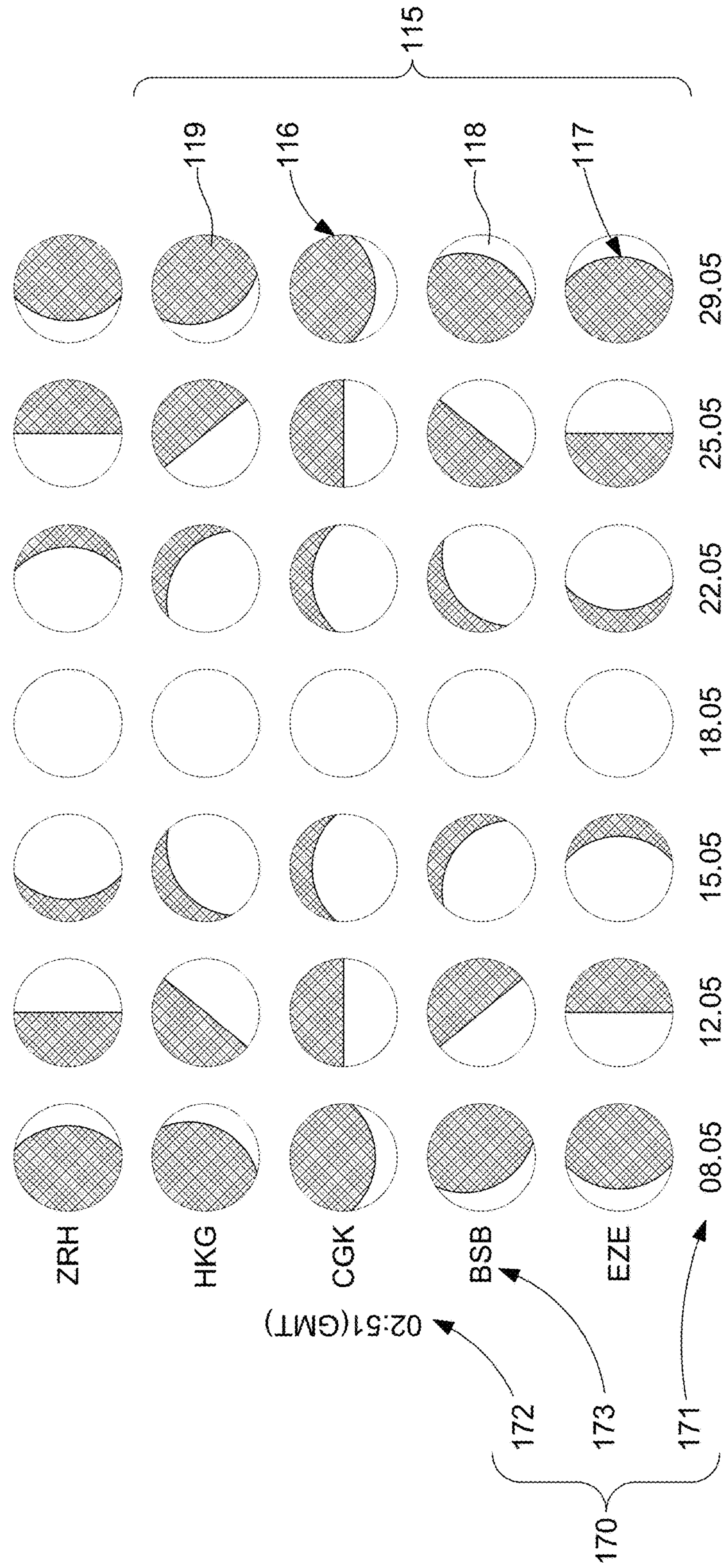
FIG. 3 shows the different shapes and relative positions of each Moon phase 116 of said set of Moon phase representations 115 and of said at least one aperture 120 according to certain parameters and/or at the user's request, according to an embodiment of the invention.

Said at least one control unit is configured to receive a data set 170 capable of including at least a date 171, at least a time 172 and/or at least a geographic position 173, preferably indicated by the airport trigrams like some watches providing several time zones, FIG. 3.

Indeed, according to the embodiments, said at least a first primary position 151, said at least a second primary position 152, said at least a first secondary position 161 and/or said at least a second secondary position 162 can be determined by the user and/or by said at least one control unit via said data set 170 which can be received by said at least one control unit via radiofrequency communication, via satellite geolocation, and/or via wired and/or light communication or introduced manually such that the different Moon phases are reproduced as faithfully as possible, whether at the user's request and/or whether automatically by said at least one control unit. Moreover, it is not ruled out to introduce the position or a latitude manually, for a mechanical watch for example, using a crown or a bezel.

One of the advantages offered by said at least one control unit is that of making it possible to control the positioning of said at least one aperture 120 and/or of said at least one Moon disk 110 so as to reproduce the image of the Moon in the sky as well as the movement of the illuminated structures, i.e. the lunar libration phenomenon, in the Northern hemisphere and/or in the Southern hemisphere.

It is also possible, thanks to these arrangements, to represent different Moon phases reproducing as faithfully as possible the position, such as the elevation of the Moon in the sky.

First Embodiment

In this first embodiment represented in FIGS. 4A and 4B, said display device 100 can function according to said at least a first primary operating mode 150 and/or according to said at least a second secondary operating mode 169.

Indeed, said at least one Moon disk 110, seen in FIG. 4A, can be rotatable along said first axis 111 between said at least a first primary position 151 and said at least a second primary position 152 in said at least a first primary operating mode 150. Said at least one aperture 120, for its part, can be immobile according to said at least a second secondary operating mode 169, FIG. 4B.

Figure 7:
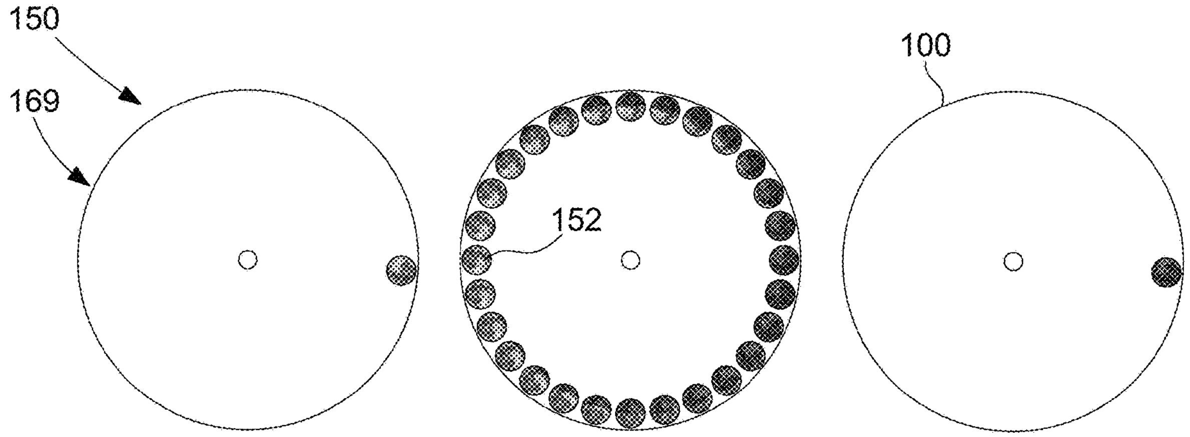

Without a request from the user or modification of said data set 170, such as for example a modification of said at least a geographic position 173, said at least one Moon disk 110, FIG. 7, moves, over time, along said first axis 111 between said at least a first primary position 151 and said at least a second primary position 152 in said at least a first primary operating mode 150 and said at least one aperture 120 remains immobile according to said at least a second secondary operating mode 169, FIG. 7.

At the user's request or according to said data set 170, if on 12.05, the user is located for example in Zürich and is travelling to the Southern hemisphere, or wishes to find out what the Moon phase is in this hemisphere for example, said at least one control unit then moves said at least one Moon disk 110 via said at least one drive organ 130, along said first primary direction 155, from said at least a first primary position 151 to said at least a second primary position 152 or along said second primary direction 156, from said at least a second primary position 152 to said at least a first primary position 151 so as to switch from the first quarter-Moon observable from ZRH to the first quarter-Moon visible in EZE, FIG. 3. The user will see a part of said set of Moon phase representations 115 scroll through said at least one aperture 120 immobile in said at least a second secondary operating mode 169.

Second Embodiment

Figure 5A:
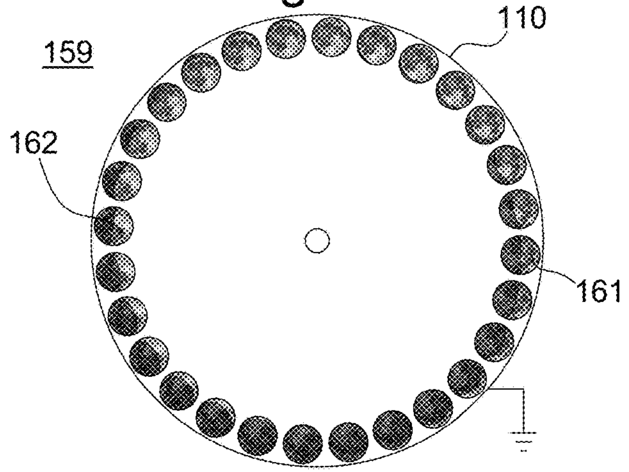
FIGS. 5A, 5B and 8 represent the use of said at least one Moon disk 110 and of said at least one aperture 120 according to a second embodiment; and, FIGS. 6A, 6B and 9 show the use of said at least one Moon disk 110 and of said at least one aperture 120 according to a third embodiment.
Figure 5B:
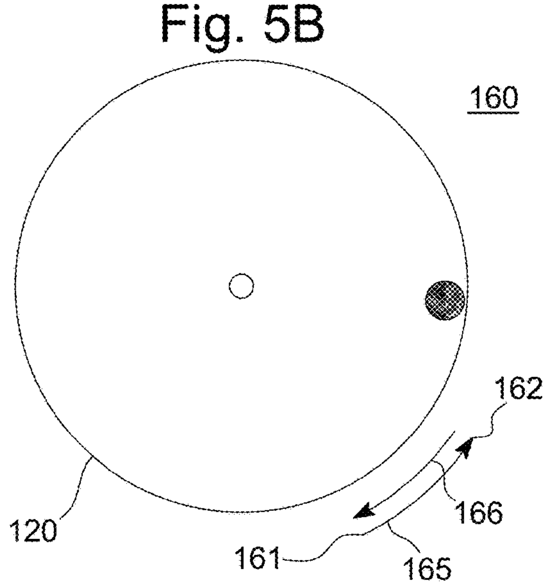

In this second embodiment represented in FIGS. 5A and 5B, said display device 100 can function according to said at least a first secondary operating mode 160 and/or according to said at least a second primary operating mode 159.

Indeed, said at least one aperture 120, seen in FIG. 5B, can be rotatable along said second axis 121 between said at least a first secondary position 161 and said at least a second secondary position 162 in said at least a first secondary operating mode 160. Said at least one Moon disk 110, for its part, can be immobile according to said at least a second primary operating mode 159, FIG. 5A.

Figure 8:
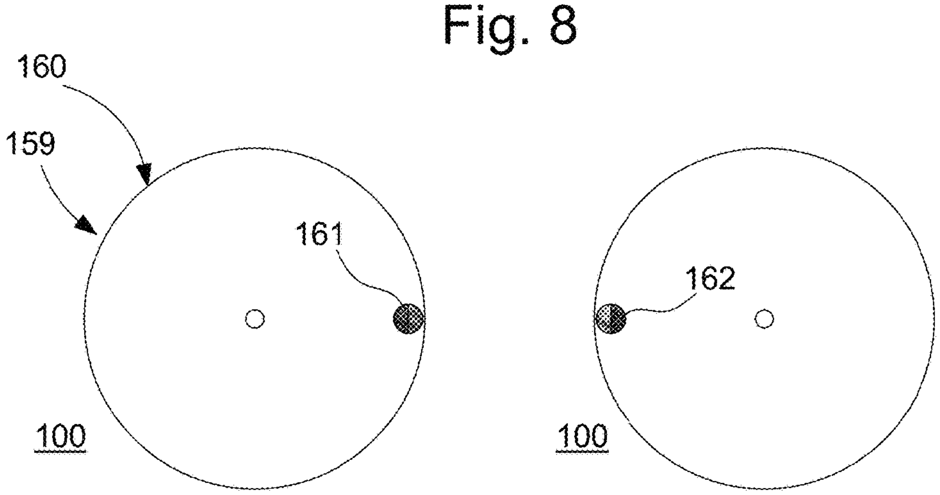

As such, at the user's request or according to said data set 170, if on 12.05, the user is located for example in Zürich and is travelling to the Southern hemisphere, or wishes to find out what the Moon phase is in this hemisphere for example, said at least one control unit then moves said at least one aperture 120 via said at least one drive organ 130, along said first secondary direction 165, from said at least a first secondary position 161 to said at least a second secondary position 162 or along said second secondary direction 166, from said at least a second secondary position 162 to said at least a first secondary position 161 so as to switch from the first quarter-Moon observable from ZRH to the first quarter-Moon visible in EZE, FIGS. 3 and 8. The user will see, scrolling through said at least one aperture 120, a part of said set of Moon phase representations 115 immobile in said at least a second primary operating mode 159.

Third Embodiment

Figure 9:
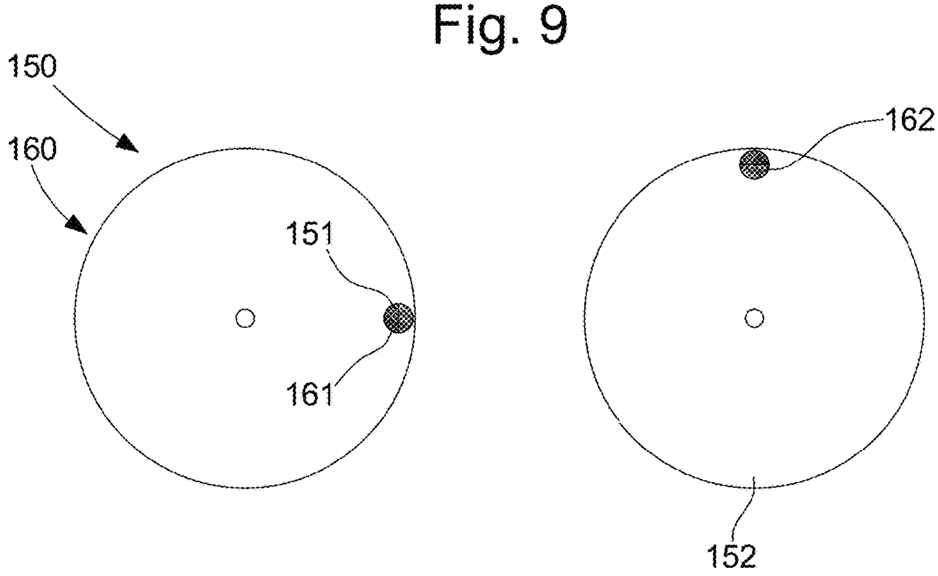

In this third embodiment represented in FIGS. 6A, 6B and 9, said display device 100 can function according to said at least a first primary operating mode 150 and according to said at least a first secondary operating mode 160.

For this purpose, said at least one Moon disk 110, seen in FIG. 6A, can be rotatable along said first axis 111 between said at least a first primary position 151 and said at least a second primary position 152 in said at least a first primary operating mode 150 and said at least one aperture 120, seen in FIG. 6B, can be rotatable along said second axis 121 between said a first secondary position 161 and said at least a second secondary position 162 in said at least a first secondary operating mode 160.

As such, at the user's request or according to said data set 170, if on 12.05, the user is located for example in Zürich and is travelling near the Equator, or wishes to find out what the Moon phase is in Indonesia, said at least one control unit then moves said at least one Moon disk 110 via said at least one drive organ 130, along said first primary direction 155, from said at least a first primary position 151 to said at least a second primary position 152 or along said second primary direction 156, from said at least a second primary position 152 to said at least a first primary position 151 so as to switch from the first quarter-Moon observable from ZRH to the first quarter-Moon visible in CGK. Simultaneously or non-simultaneously, said at least one control unit also moves said at least one aperture 120 via said at least one drive organ 130, along said first secondary direction 165, from said at least a first secondary position 161 to said at least a second secondary position 162 or along said second secondary direction 166, from said at least a second secondary position 162 to said at least a first secondary position 161, so as to switch from the first quarter-Moon observable from ZRH to the first quarter-Moon visible in CGK, FIGS. 3 and 9.

One of the major advantages of this embodiment is that of being able to represent the shape of the terminator for all the different latitudes as well as the orientation of the craters visible on the Moon.

The invention claimed is:

1. A display device for a timepiece for displaying a set of Moon phase representations reproducing the image of the Moon in the sky, said display device being configured to function according to at least a first primary operating mode and/or according to at least a first secondary operating mode and comprising at least one:

Moon disk; said at least one Moon disk comprising said set of Moon phase representations; said set of Moon phase representations including at least three Moon phases and each Moon phase of said at least three Moon phases being configured to have a first surface, a second surface and/or a delimitation configured to delimit said first surface and said second surface;

aperture; said at least one aperture being configured to reveal said set of Moon phase representations, and, drive organ; said at least one drive organ being configured to move said at least one Moon disk along a first axis in said at least a first primary operating mode and/or to move said at least one aperture along a second axis in at least a first secondary operating mode, wherein said first axis and said second axis are coaxial.

2. The display device according to claim 1, wherein said at least one Moon disk is configured to be movable along said first axis between at least a first primary position and at least a second primary position in said at least a first primary operating mode and/or said at least one aperture is configured to be movable along said second axis between at least a first secondary position and at least a second secondary position in said at least a first secondary operating mode.

3. The display device according to claim 2, which comprises at least one control unit configured to control the movement of said at least one Moon disk between said at least a first primary position and said at least a second primary position via said at least one drive organ in said at least a first primary operating mode and/or said at least one aperture between said at least a first secondary position and said at least a second secondary position via said at least one drive organ in said at least a first secondary operating mode.

4. The display device according to claim 3, wherein said at least a first primary position, said at least a second primary position, said at least a first secondary position and/or said at least one second secondary position is determined or are determined by the user and/or by said at least one control unit.

5. The display device according to claim 3, wherein said at least one control unit is configured to receive a data set; said data set includes at least:

a date;

a time; and/or a geographic position.

6. The display device according to claim 5, wherein said data set is received by said at least one control unit via radiofrequency communication, via satellite geolocation, and/or via wired and/or light communication or said data set is introduced manually.

7. The display device according to claim 1, wherein said at least one Moon disk is configured to be movable in at least a first primary direction in said at least a first primary operating mode and/or said at least one aperture is configured to be movable in at least a first secondary direction in said at least a first secondary operating mode.

8. The display device according to claim 1, wherein said first surface is an opening in said at least one Moon disk, is transparent or is translucent, said second surface is opaque or translucent, said first surface is more translucent than said second surface, and/or said first surface is brighter than said second surface.

9. The display device according to claim 1, which comprises at least one light source, said at least one light source being configured to illuminate said first surface and/or said second surface, and/or a reflective surface, wherein the reflective surface is a mirror, a white diffuse surface or a brilliant stone.

10. The display device according to claim 9, wherein said first surface, said second surface and/or said at least one light source comprises or comprise at least one relief, wherein the relief is a lunar crater.

11. The display device according to claim 1, wherein said first surface comprises a material that is reflective, luminescent, photoluminescent, and/or made of barium sulphate, and/or said second surface comprises a material that is matte, photo-absorbent, made of carbon and/or made of carbon nanotubes.

12. The display device according to claim 1, wherein said delimitation comprises a radius of curvature, said delimitation of each Moon phase of said at least three phases comprising a separate radius of curvature.

13. The display device according to claim 1, wherein said set of Moon phase representations is configured to represent the Moon libration phenomenon.

14. The display device according to claim 1, which comprises at least a second primary operating mode, wherein said at least one Moon disk is immobile, and/or at least a second secondary operating mode, wherein said at least one aperture is immobile.

15. A watch or clock comprising a display device according to claim 1.

* * * * *